United States Patent
Kudrus et al.

(10) Patent No.: US 6,713,919 B2
(45) Date of Patent: Mar. 30, 2004

(54) MAGNETIC BEARING ARRANGEMENT FOR A GODET ROLL FOR GUIDING AT LEAST ONE YARN

(75) Inventors: Heiner Kudrus, Barmstedt (DE); Dietmar von Zwehl, Bodensee (DE)

(73) Assignee: Neumag GmbH & Co. KG (DE)

( * ) Notice: Subject to any disclaimer, the term of this patent is extended or adjusted under 35 U.S.C. 154(b) by 162 days.

(21) Appl. No.: 10/061,604

(22) Filed: Feb. 1, 2002

(65) Prior Publication Data

US 2002/0113508 A1 Aug. 22, 2002

(30) Foreign Application Priority Data

Feb. 1, 2001 (DE) ............................ 101 04 423

(51) Int. Cl.[7] .............................................. H02K 1/27
(52) U.S. Cl. ..................... 310/90.5; 310/90; 310/68 R
(58) Field of Search ................... 310/90.5, 90, 68 R (56) References Cited

U.S. PATENT DOCUMENTS

| | | | |
|---|---|---|---|
| 4,180,946 A | * 1/1980 | Heijkensjold et al. | 51/134.5 |
| 5,679,992 A | 10/1997 | Miyamoto et al. | 310/90.5 |
| 5,772,564 A | 6/1998 | Taniguchi et al. | 483/7 |
| 5,973,430 A | 10/1999 | Brunet | 310/90.5 |
| 5,987,871 A | * 11/1999 | Winzen | 57/406 |
| 6,124,658 A | * 9/2000 | Coenen | 310/90.5 |

FOREIGN PATENT DOCUMENTS

| | | | |
|---|---|---|---|
| DE | 195 38 261 | 4/1997 | |
| DE | 197 07 790 | 9/1997 | |
| DE | 197 33 239 | 2/1999 | |
| EP | 0 622 972 | 11/1994 | |
| EP | 0 770 719 B1 | 5/1997 | |
| EP | 0 770 719 | 5/1997 | |
| EP | 000770719 | * 5/2000 | D02J/13/00 |

OTHER PUBLICATIONS

European Search Report.

* cited by examiner

Primary Examiner—Dang Le
Assistant Examiner—Iraj A. Mohandesi
(74) Attorney, Agent, or Firm—Kennedy Covington Lobdell & Hickman, LLP (57) ABSTRACT

A godet roll for guiding at least one yarn on the circumference of a hollow-cylindrical godet roll casing. The godet roll casing is rotatably seated on a projecting support by a bearing arrangement which includes a radially acting magnetic bearing having a plurality of bearing pole windings distributed in the circumferential direction on the support. The bearing pole windings are arranged on the support at spacings from one another circumferentially about the support and also at spacings along the support in a plurality of adjacent bearing planes in order to make possible a low-vibration guidance of the godet roll casing.

26 Claims, 7 Drawing Sheets

MAGNETIC BEARING ARRANGEMENT FOR A GODET ROLL FOR GUIDING AT LEAST ONE YARN

CROSS-REFERENCE TO RELATED APPLICATIONS

This application claims the benefit of German patent application 101 04 423.2 filed Feb. 1, 2001, herein incorporated by reference.

FIELD OF THE INVENTION

The present invention relates generally to a godet roll for guiding at least one yarn and, more particularly, to a godet roll comprising a projecting support on which a hollow-cylindrical godet roll casing forming a circumferential yarn guiding surface is rotatably supported by a plurality of bearings, at least one of the bearings comprising a radially acting magnetic bearing having a plurality of bearing pole windings spaced circumferentially relative to the godet roll casing.

BACKGROUND OF THE INVENTION

A godet roll of the above-described type to which the invention relates is disclosed in European Patent Publication EP 0 770 719 B1. This known godet roll has a godet casing connected with a motor and seated on a support. Two magnetic bearings arranged at a spacing from one other are provided for seating the godet casing, each of the magnetic bearings having several bearing pole windings. In this godet roll, the bearing pole windings of the magnetic bearing are arranged on the support in a common bearing plane oriented such that the direction of the radial forces exerted by the bearing pole windings act in the bearing plane perpendicularly in respect to the axis of rotation of the godet roll. The bearing pole windings face the interior circumference of the godet roll casing, or the exterior circumference of a driveshaft supporting the godet roll casing from two orthogonal directions.

This arrangement of the magnetic bearings is intended to make it possible to employ the godet roll for yarn treatment at high speeds, e.g., at speeds up to 8,000 meters per minute (m/min.). However, problems may be experienced because the godet rolls, which are seated in two bearing planes and rotate at high speed, must have a comparatively high rigidity to prevent deformations of the godet roll between the bearing planes and outside of the bearing planes. Special particular shapes, materials and material strengths are required to obtain sufficient rigidity. As a result, the godet roll has a large mass and requires correspondingly large, spatially extensive bearings, whereby sympathetic vibrations can occur at low natural frequencies. Such sympathetic vibrations at low natural frequencies in turn can lead to deformations and, in an extreme case, to the destruction of the godet roll. The need for definite rigidity, along with the danger of sympathetic vibrations, are obstacles to the operation of the godet roll at high speeds. A further disadvantage of the known godet roll is that the magnetic bearings with their bearing pole windings can only be used with a correspondingly large exterior diameter of the godet roll casing, in particular since the stress on the godet roll caused by the yarn guide requires a minimum pole size of the bearing pole windings.

SUMMARY OF THE INVENTION

It is therefore a basic object of the present invention to provide an improved godet roll of the type described above, and more specifically, to provide a godet roll in which the danger of deformations because of sympathetic vibrations is reduced and large bearing stresses can be assuredly absorbed even with godet roll casings of small diameter.

In accordance with the present invention, these objects are addressed by providing a godet roll wherein the bearing arrangement for the godet roll casing comprises a radially acting magnetic bearing having a plurality of bearing pole windings spaced about the support in the circumferential direction relative to the godet roll casing and also spaced along the support in a plurality of adjacent bearing planes. Thus, the present godet roll is distinguished in that the godet roll casing is radially supported over a larger bearing area extending in the longitudinal direction of the godet roll casing. In this manner, a sufficient rigidity is created, even with thin-walled godet casings, which makes it possible to operate the godet roll at high speeds without vibration problems. By means of this arrangement of bearing pole windings in accordance with the present invention, it is possible to utilize the largest possible bearing pole windings into the installation space available within the godet roll casing, so that magnetic bearings with a great support strength in particular can be provided.

As used herein, a godet roll is intended and is to be understood to comprise any rotating roller employed for yarn guidance in textile machines or spinning installations. Therefore the present invention is intended to encompass both godet rolls whose godet roll casing is driven by a drive mechanism, for example an electric motor, or where the godet roll casing is seated freely rotatable in the support.

The distribution of the bearing pole windings over the support allows a uniform distribution of the positions of the bearing pole windings on the surface of an imagined cylinder arranged around the axis of rotation of the godet roll and extending through the bearing poles. In a godet roll of the prior art, the bearing poles of the magnetic bearing are arranged in a single bearing plane. Distributing the bearing pole windings over an additional bearing plane alone results in a considerably more uniform distribution of the position of the bearing pole windings on this imagined surface area, for example in godet rolls whose axial dimension is greater than their diameter.

An arrangement of the bearing pole windings in more than three bearing planes can make possible further uniformity in the positions of the bearing pole windings on the imagined surface area, in particular with godet rolls of a large axial dimension.

The arrangement in accordance with the present invention of the bearing pole windings via the support leads to an uniform distribution of the positions at which a force is introduced into the radial seating of the godet roll surface area. The tendency of the godet roll to become deformed at high speeds, for example to bend in case of sympathetic vibrations, is reduced. A reduced spacing between the bearing pole windings corresponds to a reduced free distance of the godet roll surface area to be bridged. In addition to the reduced deformability, the requirement for rigidity of the godet roll casing is also reduced. As a result, it is possible to utilize a godet roll casing of reduced mass, and therefore higher natural oscillations. A reduced tendency to deform and a reduced mass allow the operation of the godet roll at higher speeds.

In accordance with an advantageous further aspect of the present invention, at least some of the bearing pole windings can be arranged at offset angles from one bearing plane to another bearing plane. In case of such an angular offset arrangement of two bearing pole windings, the angular position of a second bearing pole winding in a second bearing plane is differentiated from a first bearing pole winding in a first bearing plane. The angular position of a bearing pole winding is the position of the bearing pole winding at the circumference of the support, or at the circumference of an imagined cylinder, in relation to a reference position expressed as the angle between the radius of the position and the radius of the reference position. If a position perpendicularly above the axis of rotation is selected as the reference position, the angular positions perpendicularly below the axis of rotation are 180 degrees spaced therefrom, and those of the lateral positions on the level of the axis of rotation are 90 degrees and 270 degrees spaced therefrom.

With an angularly offset arrangement of the bearing pole windings, the directions from which a force is exerted on the godet roll casing vary. This arrangement makes possible a radial seating of the godet roll casing with an arrangement of only one or two bearing pole windings in one bearing plane, and possibly also in a plurality of bearing planes. In the process, it is necessary that the bearing pole windings of different bearing planes cooperate. The distribution of the bearing pole windings over the stator can be made further uniform by means of an angularly offset arrangement of the bearing pole windings from bearing plane to bearing plane.

In accordance another aspect of the present invention, a spirally-extending arrangement of at least some bearing pole windings from one bearing plane to the next achieves further uniformity in the distribution of the bearing pole windings on the support. It is advantageous if the angular offset of the bearing pole windings from bearing plane to bearing plane lies between 90 degrees and 180 degrees, for example at 120 degrees, and the helix formed by the spiral arrangement of bearing pole windings extends over at least two revolutions.

An arrangement wherein the bearing pole windings individually arranged in the bearing planes increases the planar character of the radial seating of the godet roll casing, which can make possible further uniformity in the distribution of the bearing pole windings on the support.

The arrangement of the bearing pole windings in pairs opposite each other in the respective bearing planes can make possible an even distribution of the bearing pole windings over the support, in particular in connection with godet rolls of large diameter. This arrangement is particularly suited for achieving greater plane-related bearing forces.

However, for increasing the bearing force, there is also the possibility of arranging the bearing pole windings of adjacent bearing planes overlappingly in the circumferential direction of the support.

To assure that all bearing pole windings of the magnetic bearing work together, a sensor for monitoring a bearing gap is assigned to each one of the bearing pole windings in accordance with an advantageous further development of the invention. The sensors and the bearing pole windings are connected with a control device, so that every signal bearing gap deviation can be immediately corrected. This arrangement provides the option of controlling every bearing pole winding individually by means of the control device, or controlling as a pair two bearing pole windings located opposite each other in one or several bearing planes by means of the control device.

With longer godet rolls, the godet roll casing is preferably seated by means of two radially acting magnetic bearings, arranged at a distance from each other and additionally by an axial bearing for absorbing the axial forces. In order to achieve the greatest possible support of the godet roll casing by the magnetic bearing, the bearing pole windings of the magnetic bearings are arranged in at least three bearing planes. It is also possible to arrange the bearing pole windings of the one magnetic bearing, as well as bearing pole windings of the other magnetic bearing, in a common center bearing plane.

The axial bearing is preferably embodied as an axially acting magnetic bearing in order to obtain a contactless guidance, so that higher speeds of the godet roll are made possible.

At least one catch bearing may be provided, as a contactless radial bearing or a resiliently clamped radial bearing, which also makes possible higher speeds of the godet roll.

For seating the godet roll casing, the godet roll of the present invention is preferably designed with the support which receives the bearing pole windings embodied such that the bearing gap is formed between the pole ends and the godet roll casing, whereby the magnetic forces act directly on the godet roll casing.

However, there is also the option of embodying the support for receiving the bearing pole windings such that the bearing gap is formed between the pole ends and a shaft penetrating the support, wherein one end of the shaft is fixedly connected with the godet roll casing and the opposite end is coupled to a drive mechanism. Such an embodiment of the present invention has the advantage of making it possible to omit an additional seating in the drive mechanism, and in addition, the annular space formed between the godet roll casing and the support is available for receiving a heating arrangement. The godet roll casing can be heated by means of a heating arrangement placed on the circumference of the support in order to make it possible to perform a thermal treatment of the yarn.

Exemplary embodiments of the godet roll in accordance with the present invention will be described in greater detail in the following disclosure, with reference to the attached drawings.

DETAILED DESCRIPTION OF THE PREFERRED EMBODIMENTS

Figure 1:
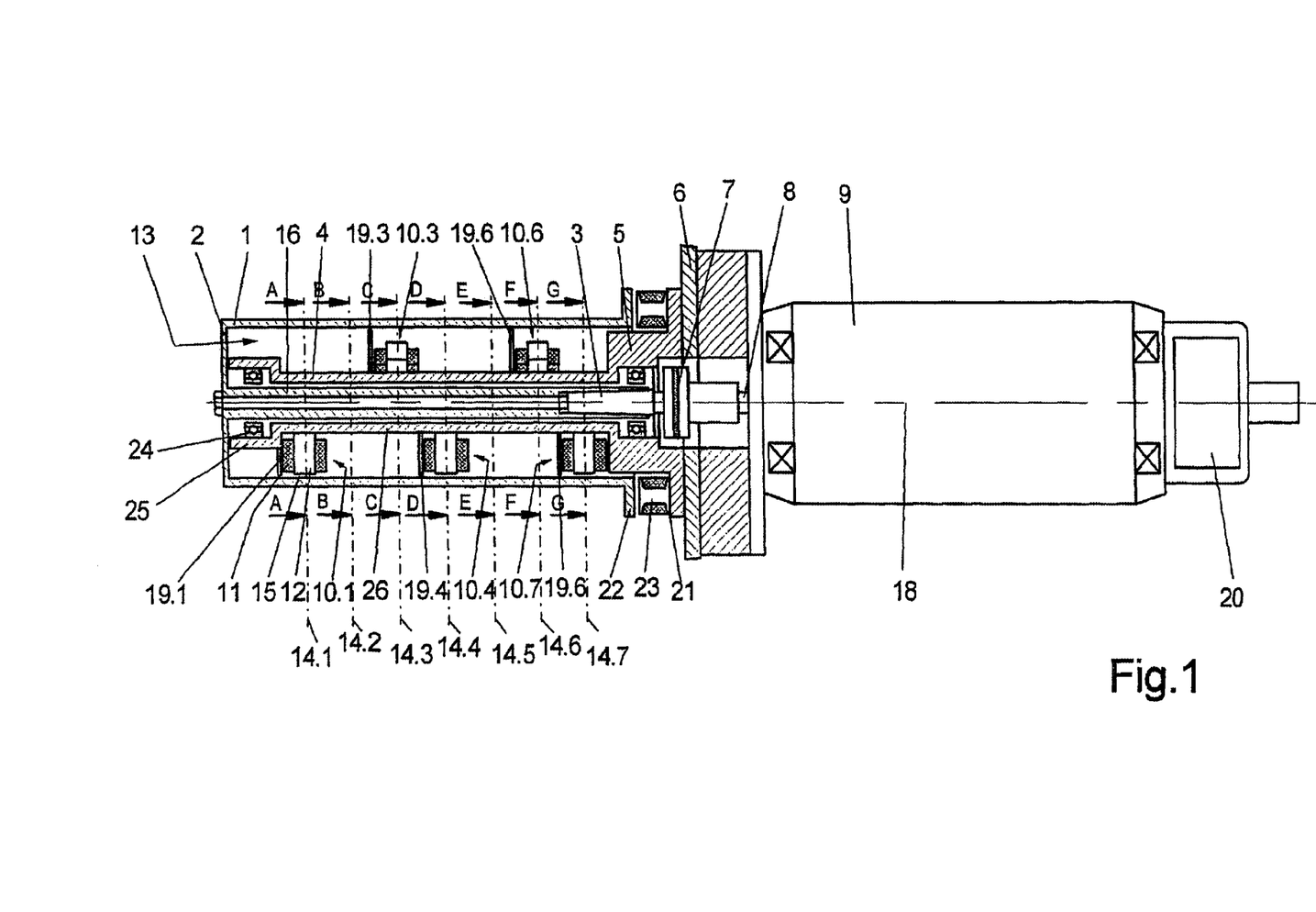
FIGS. 1 and 2 are schematic cross-sectional views of a first exemplary embodiment of a godet roll in accordance with the present invention.
Figure 2:
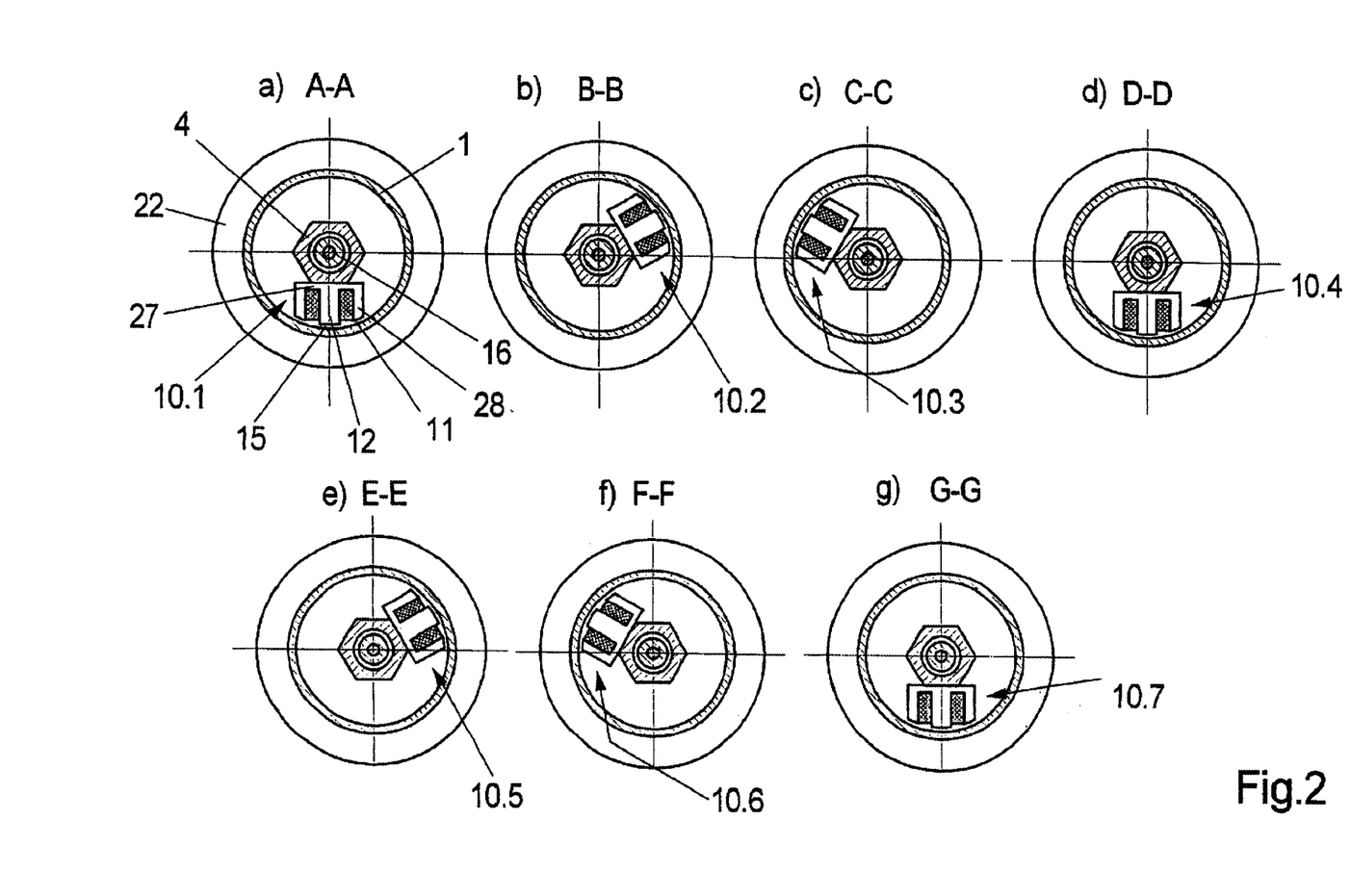

A first exemplary embodiment of the godet roll in accordance with the present invention is represented in FIGS. 1 and 2. FIG. 1 shows the elements of the godet roll which are essential for the invention, depicted by means of a cross-section taken parallel to and through the axis of rotation, and FIGS. 2a) to g) show the elements of the godet roll by means of sections taken perpendicular to the axis of rotation corresponding to the bearing plane, along section lines A—A through G—G, respectively, of FIG. 1.

Therefore, the following description applies to each of the drawings of FIGS. 1 and 2a) to 2g), whether or not an explicit reference is made to one of the drawing figures. The exemplary embodiment of the godet roll in accordance with the invention has a godet roll casing 1, which is fixedly connected via a front wall 2 and a hub 16 with a shaft 3 extending inside the godet roll casing 1 against relative rotation therebetween. The opposite end of the shaft 3 is connected via a coupling 7 to a drive shaft 8 of a motor 9. The motor 9, preferably embodied as an electric motor, is not shown in detail in FIG. 1.

The godet roll casing 1 is seated on a projecting support 4 by means of a radially acting magnetic bearing 13. The support 4 is embodied as a hollow cylinder and extends inside the godet roll casing 1 up to a short distance from the front wall 2. In this embodiment, the support 4 is penetrated by the hub 16 and the shaft 3. On the end opposite the front wall 2, the support 4 is fastened on a frame 6 by means of a collar 5. The magnetic bearing 13 comprises several bearing pole windings 10, which are arranged at spacings along the support 4 in several respective bearing planes 14. Each one of the bearing pole windings 10 is comprised of an exciter winding 11 and a pole element 12. In the embodiment as illustrated in FIGS. 1 and 2a) to 2g), a total of seven bearing pole windings 10.1 to 10.7 are arranged on the exterior circumference of the support 4 in seven adjacently located bearing planes 14.1 to 14.7. In this embodiment, the bearing pole windings 10.1 to 10.7 are also arranged on the support 4 at angularly offset spacings from one another from bearing plane to bearing plane.

A cross section of each bearing plane 14.1 to 14.7 is represented in FIG. 2, wherein the bearing plane 14.1 is represented in FIG. 2a), the bearing plane 14.2 in FIG. 2b), the bearing plane 14.3 in FIG. 2c), etc. The bearing pole windings 10.1 to 10.7 are arranged, angularly offset from bearing plane to bearing plane, on the support 4. The angular positions of the bearing pole windings 10.1 to 10.7 are 180 degrees, 60 degrees, 300 degrees, 180 degrees, 60 degrees, 30 degrees and 180 degrees. Therefore, the angular offset of the bearing pole windings 10.1 to 10.7 from bearing plane to bearing plane is 120 degrees. Because of identical angular offsets and identical distances between the bearing planes, the bearing pole windings 10.1 to 10.7 form a spiral with a constant rise around an axis of rotation 18. Respective bearing gaps 15 are formed between each one of the bearing pole windings 10.1 to 10.7 and the godet roll casing 1. A sensor 19 is assigned to each one of the bearing pole windings 10.1 to 10.7 for monitoring the bearing gap 15, or for determining the radial position of the godet roll casing 1. The sensors 19.1 to 19.7, only the sensors 19.1, 19.3, 19.4, 19.6 and 19.7 of which can be seen in FIG. 1, are connected with a control device 20 via signal lines, which are not represented. The control device 20 is connected via control lines with the exciter windings 11 of the bearing pole windings 10.1 to 10.7.

On its end facing the frame 6, the diameter of the collar 5 of the support 4 is greater than the two matching diameters of the front wall 2 and the godet roll casing 1. The collar 5 of the support 4 has a step 21 forming an annular surface facing toward the godet roll casing 1, with the diameter of the collar 5 following the step being slightly less than the interior diameter of the godet roll casing 1. With its free end located opposite the forward wall 2, the godet roll casing 1 extends into facing relation to the step 21 and has a narrow annular flange 22 at this end. The diameter of the flange 22 corresponds to the outermost diameter of the collar 5 of the support 4 which, on its end abutting the frame 6, is axially thicker in comparison to the flange 22. An axial magnetic bearing 23 is located on the collar 5 of the godet roll casing 1. In this case, bearing pole elements of the axial bearing 23, which are provided with exciter windings, are arranged on the step 21 of the collar 5 of the support tube 4 and oriented toward the flange 22 of the godet roll casing 1.

Furthermore, at least one mechanical contactless radial bearing 24 is provided as a catch bearing. In the illustrated embodiment, the ends of the support 4 have annular recesses facing the hub 16 of the godet roll casing 1, each of which recesses receives one of the radial bearings 24 arranged on the support 4. Narrow gaps are provided between the radial bearings 24 and the hub 16. The support 4 extends from the frame 6 to a location close to the forward wall 2 of the godet roll casing and includes the collar 5 with the step 21 immediately adjacent the frame 6, the inner surface of the collar 5 surrounding and facing the hub 16 to form one of the aforementioned recesses for the first radial bearing 24, a central elongate section 26 of the support 4 outwardly from the collar 5 for supporting the bearing pole windings 10.1 to 10.7, and an outermost section 25 of an enlarged diameter forming another inwardly facing recess for receiving the second radial bearing 24. The central section 26 of the support 4, which receives the bearing pole windings 10.1 to 10.7, is of a hexagonal configuration presenting six outer surfaces forming a hexagon in a cross section perpendicular to the axis of rotation 18. The bearing pole windings 10.1 to 10.7 have pole elements 12, for example of an E-shape, each of which are embodied with one bottom plate 27 and three legs 28, with the exciter winding 10 wound around the center leg 28. Each of the bearing pole windings 10.1 to 10.7 are disposed with their respective bottom plates 27 resting on one of the six outer surfaces of the section 26 of the support 4. The direction of force, for example of the bearing pole winding 10.1, extends in the direction of the radius extending perpendicularly in respect to the outer surface of the bearing pole winding 10.1 (FIG. 2a). The angular positions of the bearing pole windings which are possible when forming the section 26 for the bearing pole windings 10.1 to 10.7 are the six angular positions 0 degrees, 60 degrees, 180 degrees, 240 degrees and 300 degrees.

In alternative embodiments with other than six angular positions for the bearing pole windings 10.1 to 10.7, the section 26 of the support 4 can be embodied as a different polygon than a hexagon, for example a pentagon or an octagon.

In a further alternative embodiment, the support 4 and the bearing pole windings 10.1 to 10.7 can be designed such that the bearing pole windings 10.1 to 10.7 are arranged on the interior circumference of the support 4 and face toward the hub 16 of the godet roll casing. In such an embodiment, the bearing gaps would arise between the bearing pole windings 10.1 to 10.7 and the hub 16.

In another contemplated alternative, the sensors 19 can be distributed over the godet roll independently of the positions of the bearing pole windings 10.1 to 10.7.

During operation, the actual position of the godet roll casing is measured by the sensors 19.1 to 19.7, and the measured values are transmitted to the control device 20. The position of the entire godet roll casing is determined in the control device 20 from the measured values and the individual exciter windings 11 of the bearing pole windings 10.1 to 10.7 are actuated in accordance with any desired correction of the godet roll position. In the process, several of the bearing pole windings 10.1 to 10.7 are simultaneously actuated in most cases, and the position of the godet roll casing is corrected by the mutual exertion of force by the respective bearing pole windings 10.1 to 10.7. The cooperation of the bearing pole windings 10.1 to 10.7 leads to a rather flat seating of the godet roll casing 1.

Figure 3:
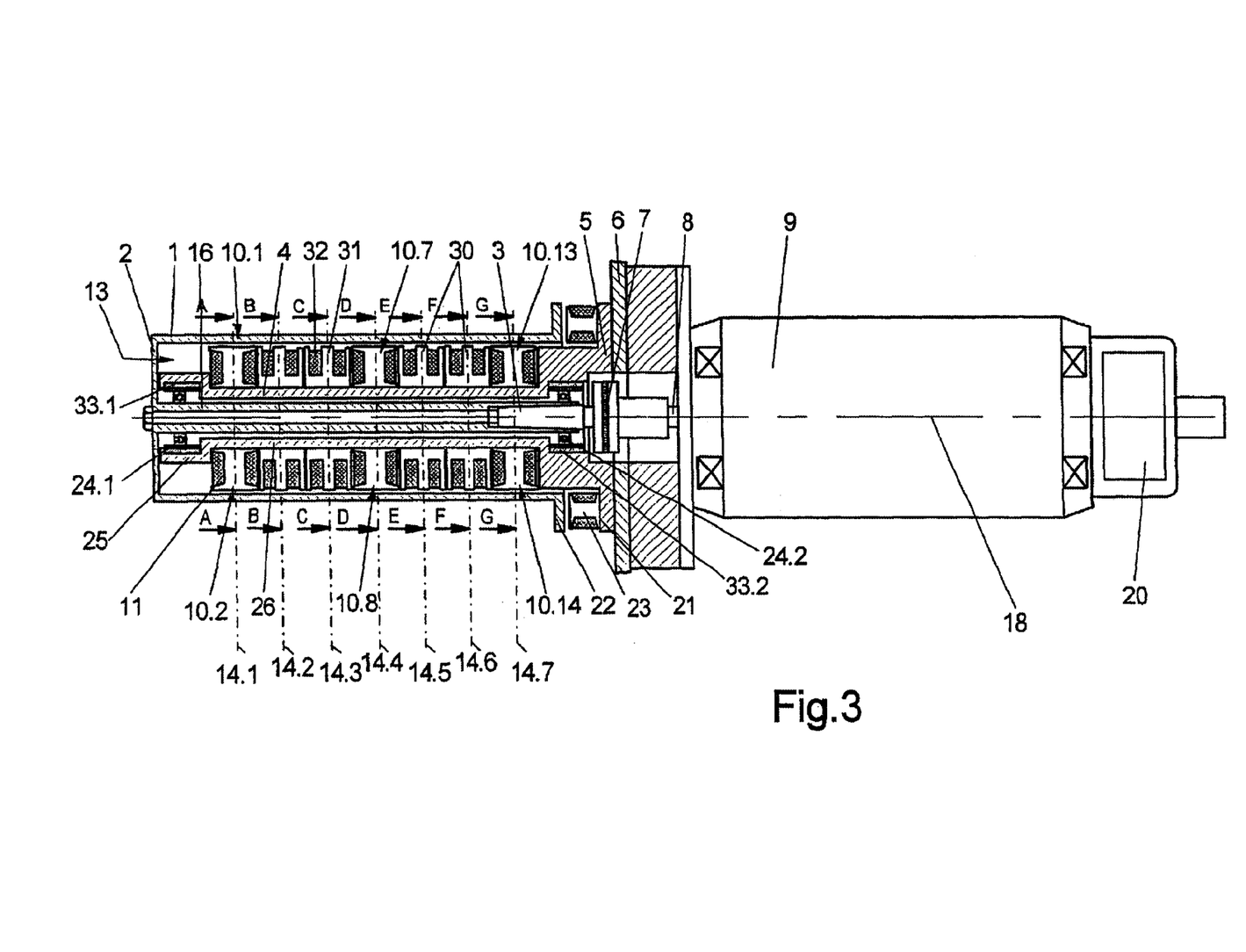
FIGS. 3 and 4 are schematic cross-sectional views of a further exemplary embodiment of a godet roll in accordance with the present invention.
Figure 4:
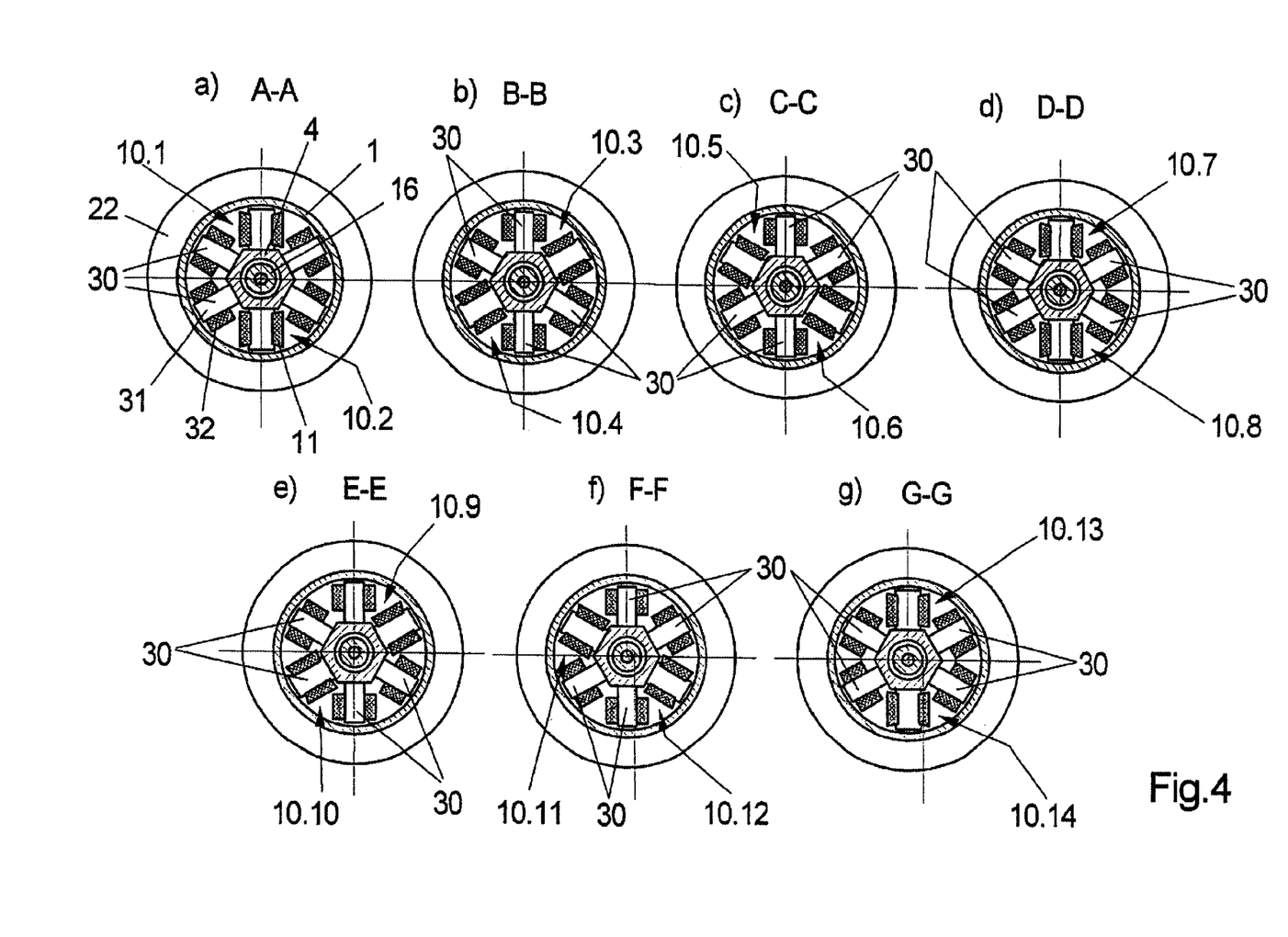

A further exemplary embodiment of the godet roll in accordance with the present invention is represented in FIGS. 3 and 4. Here, FIG. 3 shows a schematic longitudinal section through the elements of the godet roll essential for the invention similar to that of FIG. 1, and FIGS. 4a) to 4g) each show a cross section through the bearing planes of the godet roll, similar to the drawings of FIGS. 2a) to 2g). Components with the same functions are provided with identical reference numerals.

The following description applies to FIGS. 3 and 4, except in the cases of explicit references made to a particular one of the drawing figures. The exemplary embodiment essentially corresponds to the exemplary embodiment of the godet roll in accordance with the invention in FIG. 1, so that only the differences will be explained in what follows. The godet roll casing 1 is seated on the projecting support 4 by means of a magnetic bearing 13. For this purpose the magnetic bearing 13 has a total of fourteen bearing pole windings 10.1 to 10.14, which are arranged in pairs opposite each other, each in one bearing plane 14. Thus, the bearing pole windings 10.1 to 10.14 are distributed on a total of seven bearing planes 14.1 to 14.7. The angular positions of the two bearing pole windings 10.1 and 10.2 to 10.12 and 10.14 in the bearing planes 14.1 to 14.7 are 0 degrees and 180 degrees, 60 degrees and 240 degrees, 120 degrees and 30 degrees, 0 degrees and 180 degrees, 60 degrees and 240 degrees, 120 degrees and 300 degrees and 0 degrees and 180 degrees, i.e. the bearing pole windings 10.1 to 10.14 are arranged at angular offsets from bearing plane to bearing plane. The bearing pole windings 10.1 to 10.14 thusly form two spirals around the axis of rotation 18, each with two revolutions of constant rise.

Each of the bearing pole windings 10.1 to 10.14 have cylindrical pole elements 12, around which exciter windings 11 are wound. The pole elements 12 of the bearing pole windings 10.1, 10.2 to 10.13, 10.14 are arranged in pairs in their respective bearing planes 14 on two oppositely located outer surfaces of the section 26 of the support 4, also embodied in a hexagonal cross-sectional configuration.

Several heating pole windings 30 of a heating device are arranged on the support 4 between the bearing pole windings 10.1 to 10.14, which inductively heat the godet roll casing. For this purpose, the heating pole windings 30 are arranged in each bearing plane on the remaining outer surfaces of the section 26 of the support 4 which are not occupied by the bearing pole windings. Here, the heating pole windings 30 are comprised of a pole element 31 and an exciter winding 32. The exciter windings 32 are connected via control lines to a heating control device (not represented in the drawings). The uniform distribution of the bearing pole windings 10.1 to 10.14 on the support 4 also makes possible a uniform distribution of the heating pole windings 30 on the support 4, and thus uniform heating of the godet roll casing 1, besides the flat seating.

The sensors 19 have been omitted from FIGS. 3 and 4 for the sake of clarity. The radial bearings 24.1 and 24.2, respectively provided at the free ends of the support 4 and on the clamped end of the support 4 are directly connected with the circumference of the shaft 3. Here, resiliently acting sleeves 33.1 and 33.2 are respectively arranged between the support 4 and the radial bearings 24.1 and 24.2. For this purpose, the sleeves 33.1 and 33.2 could have a metal ring located in the interior for receiving the radial bearing 24, and an elastomer ring located on the outside for support on the support 4. With this arrangement, a dependable start-up, or emergency running of the godet roll casing independently of the magnetic bearing, is possible.

A further alternative embodiment could utilize prestressed radial bearings to absorb the axial forces of the godet roll casing. In such an embodiment, the axial bearing formed on the collar 5 of the support 4 could be omitted.

During operation, the cooperation between the bearing pole windings 10.1 to 10.14 takes place, for example, by actuating defined bearing pole windings 10.1 to 10.14 in case of defined faulty positions of the godet roll casing. Some faulty positions and the bearing pole windings actuated to correct the faulty positions are as follows:

a) Upward deflection of the godet roll casing 1 at an end adjacent the frame 6:
  Bearing pole windings 10.2, 10.4, 10.6, 10.9, 10.11 and 10.13 are actuated.
b) Upward displacement of the godet roll casing 1:
  Bearing pole windings 10.1, 10.3, 10.5, 10.7, 10.9, 10.11 and 10.13 are actuated.
c) Deflection at the end adjacent the frame 6 of the godet roll casing 1 in a view from the godet roll toward the left side of the frame 6 (FIGS. 4a) to 4g)):
  Bearing pole windings 10.3, 10.6, 10.10 and 10.11 are actuated.
d) Displacement of the godet roll casing 1 toward the left side:
  Bearing pole windings 10.4, 10.5, 10.10 and 10.11 are actuated.
e) First sympathetic vibration with the vibrations bulge toward the top:
  The bearing pole windings 10.3 to 10.12 are actuated such that they counteract the vibration bulge. In the process, the geometric center is displaced out of the center in order to achieve rotation around the mass center point,
f) Second sympathetic vibration with vibration bulges toward the top at the end of the godet roll away from the frame 6, and toward the bottom at the end of the godet roll pointing toward the frame 6:
  The bearing pole windings 10.3 to 10.6 operate oppositely to the bearing pole windings 10.9 to 10.12.

In this case, every one of the bearing pole windings 10.1 to 10.14 acts to attract the godet roll casing 1. For correcting the position of the godet roll casing 1, the force of individual bearing pole windings, namely of those bearing pole windings mentioned in the cases a) to f) above, is increased by increasing the current applied to the corresponding exciter windings 11. The current strength, and therefore the force on the godet roll casing, can remain constant.

It would alternatively be possible to keep the entire current strength for the bearing pole windings 10.1 to 10.14 constant and to only perform a redistribution of the partial current strengths supplied to the individual bearing pole windings 10.1 to 10.14 for correcting the position of the godet roll casing 1.

The exemplary embodiments represented in FIGS. 1 to 3 are based on a godet roll casing seated in a magnetic bearing. However, it is also possible to design the exemplary embodiments represented in such a way that the godet roll casing 1 is seated in two separate magnetic bearings. In such an embodiment, the two magnetic bearings would be controlled separately from each other.

Figure 5:
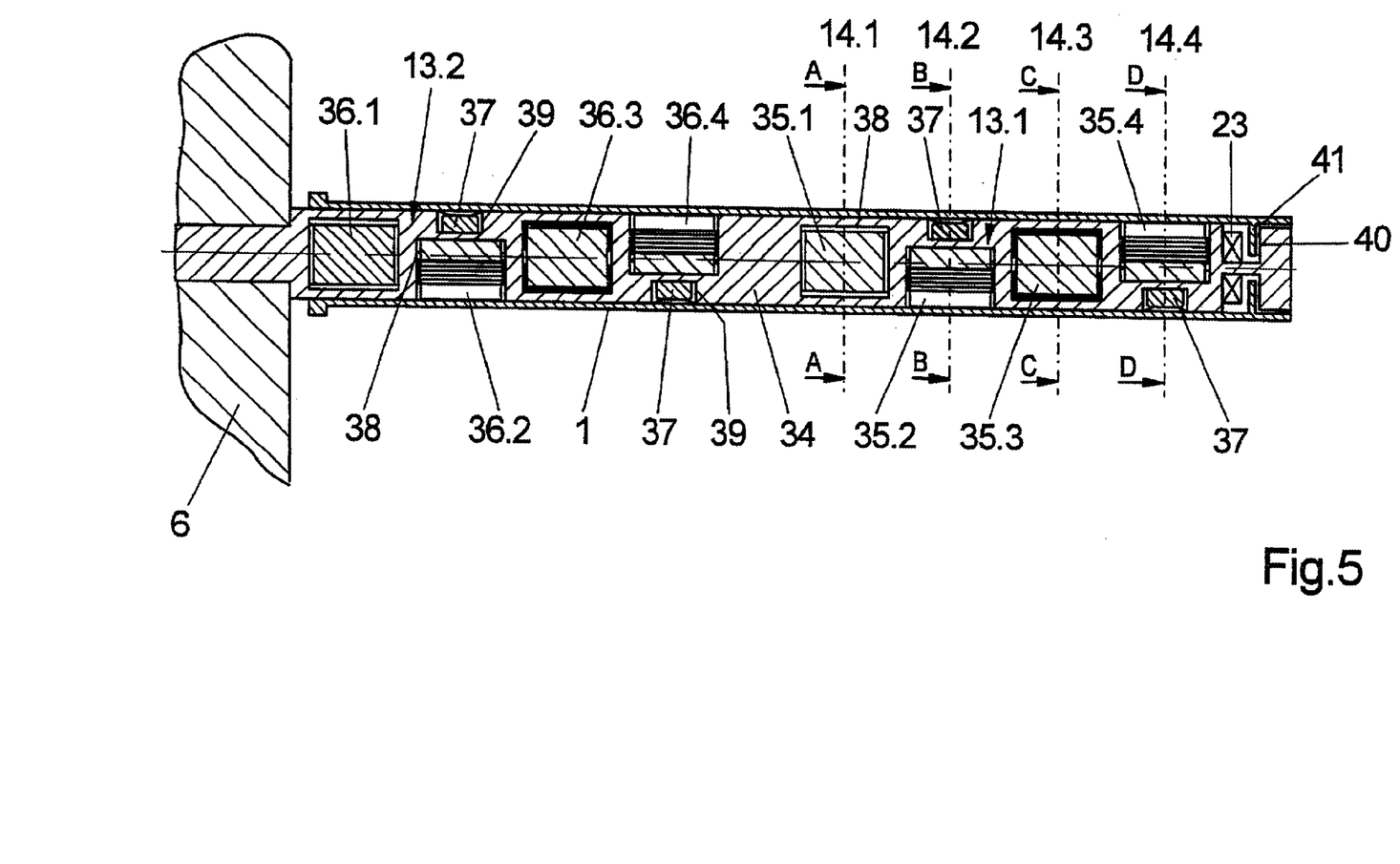
FIGS. 5 and 6 are schematic cross-sectional views of a further exemplary embodiment of a godet roll in accordance with the present invention.
Figure 6:
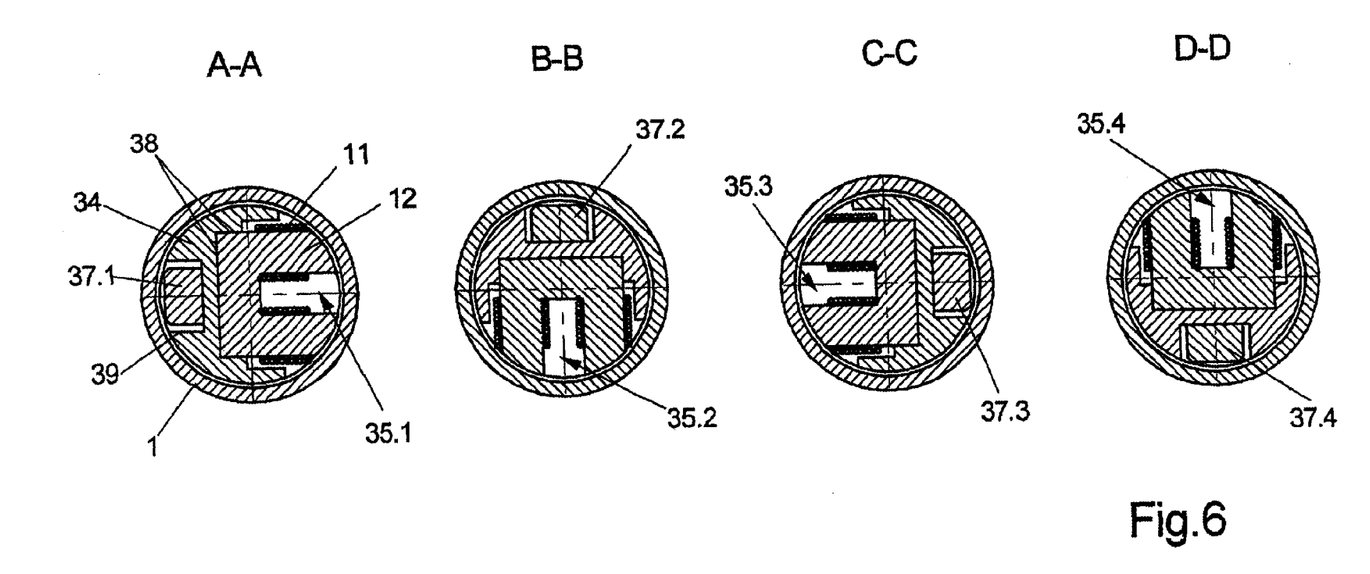

In FIGS. 5 and 6, a further exemplary embodiment of a godet roll, wherein the godet roll casing 1 is not driven by a motor, is represented. Here the exemplary embodiment is represented schematically in longitudinal section in FIG. 5, and in FIG. 6 in several cross sections along the bearing planes. Hereagain, components with the same function are identified by identical reference numerals. The exemplary embodiment of the godet roll of the present invention has an elongate projecting support 34, one side of which is fastened on a frame 6. The hollow-cylindrically embodied godet roll casing 1 is seated for free rotatability on the support 34. The radially acting magnetic bearings 13.1 and 13.2, as well as an axial bearing 23, are provided for seating the godet roll casing 1. The magnetic bearing 13.1 has four bearing pole windings 35.1 to 35.4, which are arranged at spacings from each other in respective bearing planes 14.1 to 14.4. In this case, each of the bearing pole windings 35.1 to 35.4 are respectively arranged on the support 34 offset from one another by an angle of 90 degrees. To this end, the support 34 has several recesses 38, in which the bearing pole windings 35 are fixedly arranged. The bearing pole windings 35 are of a size requiring a recess 38 in the support 34 which extends past the center axis of the support 34. On the side of the support 34 located opposite the recess 38 a smaller recess 39 is provided, in each of which sensors 37 are arranged. In this embodiment, a sensor 37.1 to 37.4 is assigned opposite each one of the bearing pole windings 35.1 to 35.4. For example, the bearing pole windings 35 may be comprised of a U-shaped pole element 12, on whose legs the exciter windings 11 are fastened. Each one of the exciter windings 11 of the bearing pole windings 31.5 to 35.4, together with the sensors 37.1 to 37.4, is connected to a control device, not represented in the drawings. In this case, each one of the bearing pole windings 35 can be controlled independently of the adjoining bearing pole windings.

The magnetic bearing 13.2 in the area of the clamping of the support 34 is also embodied to have four bearing pole windings 36.1 to 36.4. The design and arrangement of the bearing pole winding 36 is identical to the magnetic bearing 13.1, so that a further description can be omitted as unnecessary.

A circumferential recess 40 is formed in the free end of the support 34 and receives an axial bearing 23. In this embodiment, the axial bearing acts on a circumferential flange 41, which is fixedly connected with the godet roll casing 1. In this embodiment, the axial bearing 23 is preferably embodied as a magnetic bearing.

Each one of the radially acting magnetic bearings 13.1 and 13.2 can be actuated via a control device, not represented in the drawings. In the process, the exciter windings 11 of the bearing pole windings 35, or of the bearing pole windings 36, inside of the respective magnetic bearing 13 are individually controlled in accordance with the sensor signals such that a constant bearing gap exists between the pole ends of the bearing pole windings 35 and 36. As a so-called overflow roller in a drafting device, this exemplary embodiment of the godet roll in accordance with the present invention is particularly suited for receiving a yarn transported from a driven godet roll, preferably for example in several loops for stretching or thermal treatment of the yarn. Typically, such godet rolls are embodied with a relatively small exterior diameter, wherein the bearing stresses generated on the godet roll casing 1 by the looping are comparable to driven godet rolls.

Figure 7:
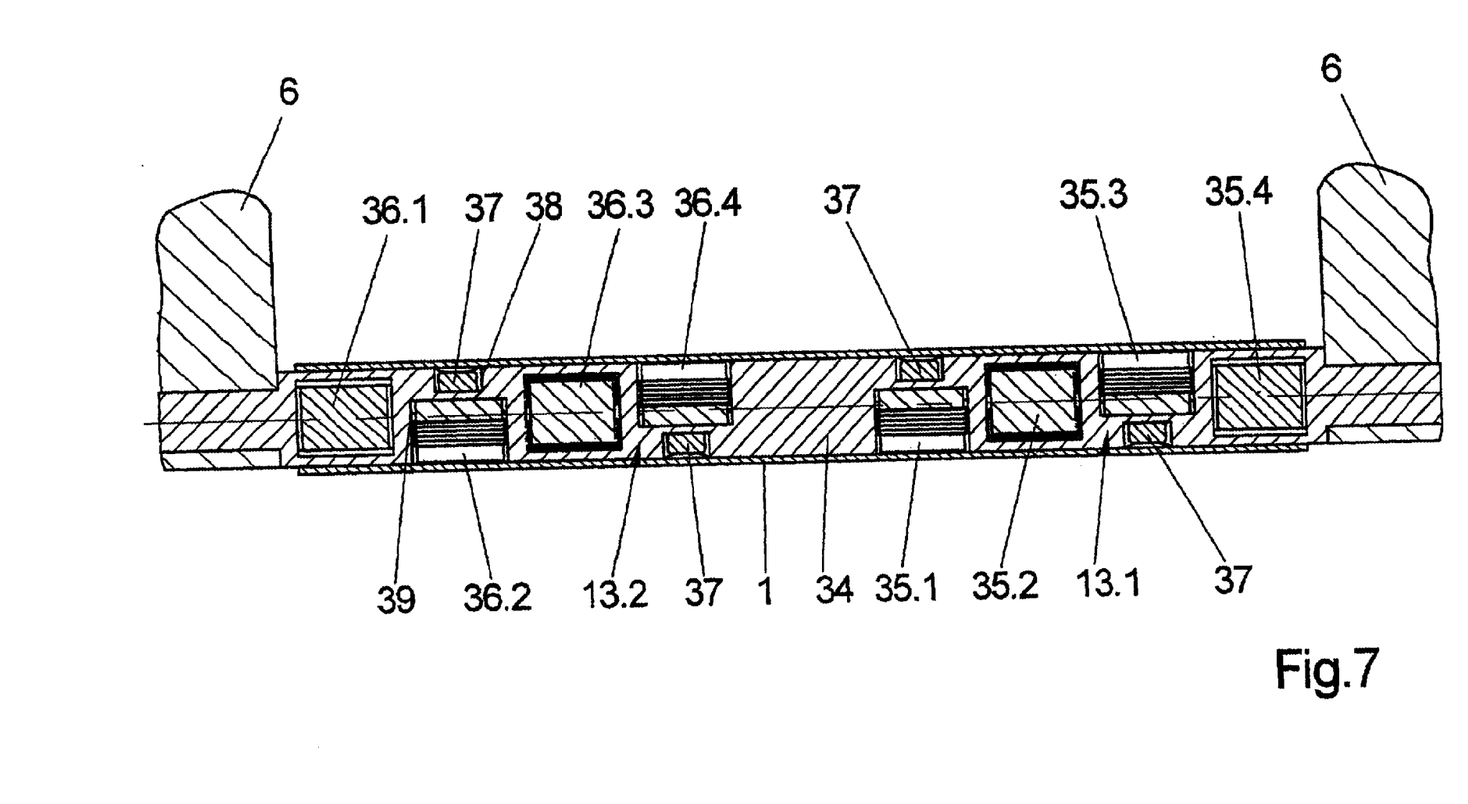
FIG. 7 is a schematic cross-sectional view of a further exemplary embodiment of a godet roll in accordance with the present invention.

A further exemplary embodiment of a non-driven godet roll is represented in FIG. 7, which is essentially embodied identical to the exemplary embodiment in accordance with FIGS. 5 and 6. To this extent reference is made to the previous description, and only the differences will be mentioned in what follows.

In this embodiment, however, both ends of the cylindrical support 34 are fixedly supported by a frame 6. A godet roll support 1 is rotatably seated on the circumference of the support 34. The magnetic bearings 13.1 and 13.2 are arranged in this embodiment on the support 34. The magnetic bearings 13.1 and 13.2 are constructed identical to the previous exemplary embodiment of FIGS. 5 and 6.

The magnetic bearings 13.1 and 13.2 are controlled for seating the godet roll casing 1 such that the bearing gap located between the bearing pole windings 35 and 36 and the godet roll casing 1 remains essentially constant.

An axial seating of the godet roll casing is not represented. In this embodiment, the axial forces can also be absorbed by an appropriate shaping of the pole ends of the bearing pole windings 35 and 36, for example. However, it is also possible to arrange additional radial bearings or axial bearings between the godet roll casing 1 and the support 34.

The exemplary embodiment of the godet roll represented in FIG. 7 is preferably employed as a guide roller for placing yarn on a bobbin. The yarn is guided in such an embodiment on the circumference of the godet roll casing 1.

Thus, the godet roll in accordance with the present invention is distinguished, on the one hand, by a particularly low-vibration seating of the godet roll casing, and on the other hand by a very compact construction. It is essential for purposes of the present invention that the bearing pole windings of the magnetic bearing(s) are arranged distributed in several bearing planes.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A godet roll for guiding at least one yarn, the godet roll comprising a projecting support, a hollow-cylindrical godet roll casing forming a circumferential yarn guiding surface, and a bearing arrangement rotatably seating the godet roll casing on the projecting support, the bearing arrangement comprising a radially acting magnetic bearing having a plurality of bearing pole windings spaced both about the support in the circumferential direction relative to the godet roll casing and along the support in a plurality of adjacent bearing planes, wherein only one of the bearing pole windings of the radially acting magnetic bearing is arranged in each of the bearing planes.

2. The godet roll in accordance with claim 1, characterized in that at least some of the bearing pole windings are arranged on the support at angular offsets from bearing plane to bearing plane.

3. The godet roll in accordance with claim 2, characterized in that the bearing pole windings are in a spiral-shaped arrangement in the longitudinal direction of the support.

4. The godet roll in accordance with claim 1, characterized in that the bearing pole windings of adjoining bearing planes are arranged in overlapping relation in the circumferential direction of the support.

5. The godet roll in accordance with claim 1, characterized in that a sensor for monitoring a bearing gap is associated with each one of the bearing pole windings, and the sensors and the bearing pole windings are connected with a control device.

6. The godet roll in accordance with claim 5, characterized in that the bearing pole windings are individually controllable by the control device.

7. The godet roll in accordance with claim 5, characterized in that the bearing pole windings are controllable in pairs by the control device.

8. The godet roll in accordance with claim 1, characterized in that the bearing arrangement comprises two of the radially acting magnetic bearings and one axial bearing for seating the godet roll casing, the bearing pole windings of the magnetic bearings being arranged in at least three bearing planes.

9. The godet roll in accordance with claim 8, characterized in that the axial bearing comprises an axially acting magnetic bearing.

10. The godet roll in accordance with claim 1, characterized in that at least one catch bearing is provided, the catch bearing comprising a contactless radial bearing or a resiliently clamped radial bearing.

11. The godet roll in accordance with claim 1, characterized in that the support for receiving the bearing pole windings forms a bearing gap between pole ends thereof and the godet roll casing.

12. The godet roll in accordance with claim 1, characterized in that the support for receiving the bearing pole windings forms a bearing gap between the pole ends thereof and a shaft extending within the support, the shaft being fixedly connected with the godet roll casing.

13. The godet roll in accordance with claim 1, characterized in that at least one heating device is provided for heating the godet roll casing.

14. A godet roll for guiding at least one yarn, the godet roll comprising a projecting support, a hollow-cylindrical godet roll casing forming a circumferential yarn guiding surface, and a bearing arrangement rotatably seating the godet roll casing on the projecting support, the bearing arrangement comprising a radially acting magnetic bearing having a plurality of bearing pole windings spaced both about the support in the circumferential direction relative to the godet roll casing and along the support in a plurality of adjacent bearing planes, wherein a pair of the bearing pole windings disposed opposite each other is arranged in each of the bearing planes.

15. The godet roll in accordance with claim 14, characterized in that at least some of the bearing pole windings are arranged on the support at angular offsets from bearing plane to bearing plane.

16. The godet roll in accordance with claim 15, characterized in that the bearing pole windings are in a spiral-shaped arrangement in the longitudinal direction of the support.

17. The godet roll in accordance with claim 14, characterized in that the bearing pole windings of adjoining bearing planes are arranged in overlapping relation in the circumferential direction of the support.

18. The godet roll in accordance with claim 14, characterized in that a sensor for monitoring a bearing gap is associated with each one of the bearing pole windings, and the sensors and the bearing pole windings are connected with a control device.

19. The godet roll in accordance with claim 18, characterized in that the bearing pole windings are individually controllable by the control device.

20. The godet roll in accordance with claim 18, characterized in that the bearing pole windings are controllable in pairs by the control device.

21. The godet roll in accordance with claim 14, characterized in that the bearing arrangement comprises two of the radially acting magnetic bearings and one axial bearing for seating the godet roll casing, the bearing pole windings of the magnetic bearings being arranged in at least three bearing planes.

22. The godet roll in accordance with claim 21, characterized in that the axial bearing comprises an axially acting magnetic bearing.

23. The godet roll in accordance with claim 14, characterized in that at least one catch bearing is provided, the catch bearing comprising a contactless radial bearing or a resiliently clamped radial bearing.

24. The godet roll in accordance with claim 14, characterized in that the support for receiving the bearing pole windings forms a bearing gap between pole ends thereof and the godet roll casing.

25. The godet roll in accordance with claim 14, characterized in that the support for receiving the bearing pole windings forms a bearing gap between pole ends thereof and a shaft extending within the support, the shaft being fixedly connected with the godet roll casing.

26. The godet roll in accordance with claim 14, characterized in that at least one heating device is provided for heating the godet roll casing.

* * * * *